United States Patent Office 3,023,239
Patented Feb. 27, 1962

3,023,239
RECRYSTALLIZATION OF DEMETHYL-CHLORTETRACYCLINE
Victor Emil Origoni, Emerson, N.J., and Robert Winterbottom, New City, N.Y., assignors to American Cyanamid Company, New York, N.Y., a corporation of Maine
No Drawing. Filed Dec. 9, 1959, Ser. No. 858,330
5 Claims. (Cl. 260—559)

This invention relates to the purification of demethylchlortetracycline and more particularly is concerned with an improved process for the aqueous recrystallization of demethylchlortetracycline so as to produce high yields of therapeutically useful products.

The demethyltetracyclines, demethyltetracycline itself, and demethylchlortetracycline (7-chloro-6-demethyltetracycline) are members of a new family of tetracycline antibiotics which are described and claimed in United States patent to Jerry Robert Daniel McCormick et al., No. 2,878,289. The demethyltetracyclines therein described are produced by certain mutant strains of *Streptomyces aureofaciens* derived from the chlortetracycline-producing *S. aureofaciens* A-377 soil isolate described in United States patent to Duggar, No. 2,482,055, and deposited at the Northern Regional Research Laboratory, Peoria, Illinois, as NRRL 2209. The new demethyltetracycline-producing strains were derived by treatment of A-377 with mutagenic agents. Cultures of the new demethyltetracycline-producing strains of *S. aureofaciens* are on deposit at the American Type Culture Collection, Washington, D.C., under ATCC accession numbers 12551, 12552, 12553 and 12554.

Demethylchlortetracycline, as compared to the well-known broad-spectrum antibiotic tetracycline, singularly achieves far greater antibiotic activity against susceptible organisms with far less drug; it has strikingly greater stability in body fluids; it has enhanced resistance to degradation and a low rate of renal clearance, all supporting high levels of antibiotic activity for extended periods.

Demethylchlortetracycline, the unique fermentation product of a mutant strain of *Streptomyces aureofaciens*, is almost invariably associated with small amounts of demethyltetracycline which is also a product of the fermentation. It then becomes necessary to effect a separation of these two antibiotics, or at least to recover demethylchlortetracycline in a highly purified form free of demethyltetracycline. While these two antibiotics can be effectively separated by paper chromatographic techniques, this is not practical on large scale commercial operations and efforts have been directed towards the development of a commercially practicable process for separating essentially pure demethylchlortetracycline from demethyltetracycline.

One of the best processes for the purification of chlortetracycline and tetracycline is the process disclosed in the United States patent to Winterbottom et al., No. 2,671,806. This process involves dissolving crude chlortetracycline, for example, in a hydroxylated organic solvent such as a lower alkanol by the use of a nitrogenous base, e.g. triethylamine, which serves to neutralize and solubilize the chlortetracycline. The undissolved impurities are removed by filtration and by readjusting the pH of the filtrate with hydrochloric acid to the desired level, purified chlortetracycline hydrochloride is precipitated.

This process while it is eminently suitable for the purification of chlortetracycline and tetracycline in that it produces a high quality therapeutically useful product, is not without certain disadvantages, notably in that it involves the use of hydroxylated organic solvents and organic bases which keep the cost of the purification procedure high. Additionally, and of the utmost importance here, recrystallization of demethylchlortetracycline from the organic solvents of the Winterbottom et al. patent, e.g. butanol and 2-ethoxyethanol, does not effect a reduction in the demethyltetracycline appreciably so that the final product has too high a percentage of demethyltetracycline for specification standards.

The present invention is based upon the discovery that an extremely effective separation of demethylchlortetracycline and demethyltetracycline can be effected by dissolving crude demethylchlortetracycline containing demethyltetracycline in water by the addition of an alkali metal hydroxide. The insoluble impurities are then removed by filtration and purified demethylchlortetracycline is precipitated in high yields, of the order of 90%, by the addition of a suitable mineral acid. Thus, the present invention accomplishes a result that it is not possible to obtain with the Winterbottom et al. process namely, a separation of purified demethylchlortetracycline free from demethyltetracycline and fermentation impurities.

In carrying out the present invention, crude demethylchlortetracycline, produced by fermentation of a demethylchlortetracycline-producing strain of *S. aureofaciens* as described in the aforesaid McCormick et al. patent, is slurried in water on a weight per volume basis and which may be of the order of 1:10 at a pH ranging from about 7–9 with agitation until complete solution is obtained. The solution is then filtered to remove undissolved fermentation impurities. Any suitable alkali metal hydroxide such as sodium hydroxide, potassium hydroxide, etc., may be used to make the necessary pH adjustment. The alkaline filtrate is then acidified with a strong mineral acid, e.g., hydrochloric acid, for example, at a pH of 0.5–1 and preferably at 0.6–0.7 to obtain the highest yields. The acid solution is aged with agitation for from 20–24 hours at about room temperature and the precipitated demethylchlortetracycline hydrochloride crystals which are formed are collected by filtration, washed with a mixture of concentrated hydrochloric acid in water and vacuum dried at about 50° C.

A modification of this process involves using a two-phase solvent system composed of water and a water-immiscible solvent such as a methyl alkyl ketone solvent, e.g. methyl isobutyl ketone, methyl propyl ketone and the like. This results in improving the appearance of the final product in that desirably light yellow crystals are produced. Preferably the two-phase solvent system is composed of equal parts of water and methyl isobutyl ketone.

High yields of the desired demethylchlortetracycline result in each case and both processes effect the desired separation of purified demethylchlortetracycline from associated demethyltetracycline and fermentation impurities.

The invention will be described in greater detail in conjunction with the following specific examples.

*Example 1*

A 50-gram quantity of crude demethylchlortetracycline assaying 1015 mcg./mg. and containing 83 mcg./mg. of demethyltetracycline was slurried in 500 milliliters of water. The pH of the solvent was adjusted to 9.0 by the addition of 23 milliliters of 25% (w./v.) sodium hydroxide solution. The slurry was agitated for 15 minutes before complete solution was effected. The solution was passed through a sintered glass filter precoated with Hyflo Super-Cel (a diatomaceous earth filter aid). The filtrate was acidified with 27 milliliters of concentrated hydrochloric acid at pH 0.65. The acidified solution was aged, with agitation, for 20 hours at 25° C. The crystals which formed were then collected by filtration, washed twice with 25-milliliter quantities of 5% (v./v.) hydrochloric acid solution and vacuum-dried at 50° C.

for 24 hours yielding 45.49 grams of material. The spectrophotometric assay value of the final product was 1010 mcg./mg. The yield of demethylchlortetracycline hydrochloride was 91%. The demethyltetracycline content of the product was 2.3 mcg./mg.

*Example 2*

Ten grams of crude demethylchlortetracycline assaying 969 mcg./mg. and containing 167 mcg./mg. of demethyltetracycline were slurried in a two-phase solvent system composed of 100 milliliters of water and 100 milliliters of methyl isobutyl ketone. The slurry was made alkaline to pH 9.0 by means of a 25% (w./v.) sodium hydroxide solution. The crude material was completely in solution within 15 minutes. The solution was clarified by filtration and the filtrate adjusted to pH 0.65 with concentrated hydrochloric acid. The acidified filtrate was stirred and aged for 24 hours at 20°–25° C. At the termination of this ageing period, the crystals which formed were collected by filtration, washed with two 10-milliliter portions of 5% (v./v.) hydrochloric acid plus two 10-milliliter portions of methyl isobutyl ketone and dried to constant weight in vacuo at 50° C. The spectrophotometric assay value of the final product was 1002 mcg./mg. No demethyltetracycline was detected. The yield of demethylchlortetracycline hydrochloride was 80% (on a weight basis) and 88% (on a weight-assay basis). A distinct improvement in the color of the crystals was indicated by the change in optical density $$[E^{1\%}_{1 cm.} \text{ at } 460 m\mu]$$

from 0.49 for the crude to 0.25 for the final product.

We claim:
1. A process of recrystallizing demethylchlortetracycline which comprises dissolving crude demethylchlortetracycline containing demethyltetracycline in water by the addition of alkali at a pH of from about 7–9, filtering the solution to remove insoluble impurities, and acidifying the filtrate with a mineral acid to a pH of between 0.5–1 whereupon a mineral acid salt of demethylchlortetracycline substantially free from demethyltetracycline is precipitated.
2. A process according to claim 1 in which the mineral acid is hydrochloric acid.
3. A process according to claim 1 in which the solution contains about equal parts of water and a methyl alkyl ketone solvent.
4. A process according to claim 3 in which the methyl alkyl ketone is methyl isobutyl ketone.
5. A process according to claim 4 in which the mineral acid is hydrochloric acid.

References Cited in the file of this patent
UNITED STATES PATENTS

| | | |
|---|---|---|
| 2,671,806 | Winterbottom et al. | Mar. 9, 1954 |
| 2,875,247 | Fox et al. | Feb. 24, 1959 |
| 2,878,289 | McCormick et al. | Mar. 17, 1959 |
| 2,886,595 | Heinemann et al. | May 12, 1959 |